May 26, 1970 H. BLAUERT 3,514,638

PULSE DETECTION APPARATUS

Filed Sept. 28, 1967 2 Sheets-Sheet 1

United States Patent Office 3,514,638
Patented May 26, 1970

3,514,638

PULSE DETECTION APPARATUS

Hans Blauert, Munich, Germany, assignor to Siemens Aktiengesellschaft, Berlin, Germany Filed Sept. 28, 1967, Ser. No. 671,482
Claims priority, application Germany, Sept. 29, 1966, S 106,215
Int. Cl. H03k 5/00
U.S. Cl. 307—268 14 Claims

ABSTRACT OF THE DISCLOSURE

A receiving circuit to detect applied synchronization pulses that are subject to distortion during transmission to said receiving circuit. An integration circuit is utilized to evaluate applied synchronization pulses and control operation of a transistor switch, so that the receiving circuit is responsive to the trailing edges of received synchronization pulses to corresponding control pulse generating means associated with the receiving circuit. The pulse generating means therefore produce pulses corresponding to applied pulses evaluated as synchronization pulses. The receiving circuit is not responsive to distortions in the amplitude of transmitter synchronization pulses, to harmonic distortions thereof, or to other disturbance signals, and therefore ensures accurate detection and evaluation of received synchronization pulses.

CROSS REFERENCE TO RELATED APPLICATION

Applicant claims priority from corresponding German patent application Ser. No. S 106,215, filed Sept. 29, 1966.

BACKGROUND OF THE INVENTION

Field of the invention

The invention relates to a pulse detector that is not responsive to disturbance voltages that might produce an incorrect evaluation of received successive pulses. The invention has particular utility where the pulses are used as synchronization pulses, and thus accurate evaluation thereof is essential, and may be used in telegraph exchange installations, for example.

State of the prior art

The prior art teaches the isolation of transmission lines that are utilized to transmit synchronization pulses. Often said synchronization pulses are distorted by surrounding electromagnetic fields, and prior art arrangements normally involve means to shield the transmission lines from said electromagnetic fields. For example, synchronization pulses may be influenced by relays having relatively strong magnetic fields, that are produced by current pulses applied to the associated relay energization windings. However, such shielding means are relatively expensive.

Further, the prior art teaches that synchronization pulses may be transmitted by transmission lines that are physically isolated from possible disturbance voltages. This involves switching the synchronization pulses to such isolated transmission lines, and limits the number of transmission lines available to transmit synchronization pulses.

It is particularly difficult to isolate or shield transmission lines used to transmit synchronization pulses when a multiconductor cable is utilized, especially when relatively high-amplitude pulses signals having long time durations are transmitted by the other conductors of said multiconductor cable in view of the inherent capacitive and inductive coupling between the conductors.

SUMMARY OF THE INVENTION

These and other defects of prior art devices are solved by the present invention which provides a receiving circuit for the receipt of synchronization pulses. The receiving circuit is not influenced by disturbance signals, which, for example, may be superposed onto the synchronization pulses and may result from inductive and/or capacitive coupling between associated conductors of a multiconductor cable. The invention employs a transistor switch that is driven to the conducting state in response to the leading edge of an applied synchronization pulse. A capacitor associated with an integrating circuit is connected between the base and emitter of the transistor, and ensures accurate evaluation of the time duration of synchronization pulses. When the transistor is switched to the conducting state in response to the leading edge of a synchronization pulse, it produces an output signal that is applied to a pulse generating device in response to the trailing of the synchronization pulses. Further, the trailing edges of applied synchronization pulses drive the transistor to the nonconducting state.

If it is assumed that the synchronization pulses are produced by a transmitter and applied to a receiver, the invention provides a receiving circuit that is substantially independent of the operational voltages of the transmitter and receiver. This is achieved because the signals that are integrated to evaluate synchronization pulse time duration and those used to control operation of the transistor switch are either equal or proportional to each other. The operational voltages associated with the receiving circuit comprises a first independent voltage source, and a second voltage source that is derived from the input signals applied to the receiving circuit, and fed to associated integrating circuits to provide a relatively constant operational voltage.

Thus, the receiving circuit is not responsive to slow variations in the input signal applied thereto, because at least one operational voltage source associated with the transistor switch is derived from the input signals. Therefore, said operational voltage follows or tracks the slow variations in the input signal to substantially the same extent as the capacitor connected between the base and emitter of the transistor switch so that the transistor switch is not responsive to said slow variations. Further, relatively high amplitude voltage signals applied to the receiving circuit cannot overload the transistor switch because it is not responsive thereto.

Correct evaluation of synchronization pulses is obtained by providing a plurality of initial conditions that must be evaluated in order to activate the associated pulse generating device at the receiver. Thus, the amplitude, time duration, and steepness of the leading and trailing edges of the applied synchronization pulses are evaluated by the receiving circuit, and when such evaluations correspond to the initial conditions which correctly determine that a synchronization pulse has been received, the pulse generating device is correspondingly activated.

DETAILED DESCRIPTION OF THE INVENTION

Figure 1:
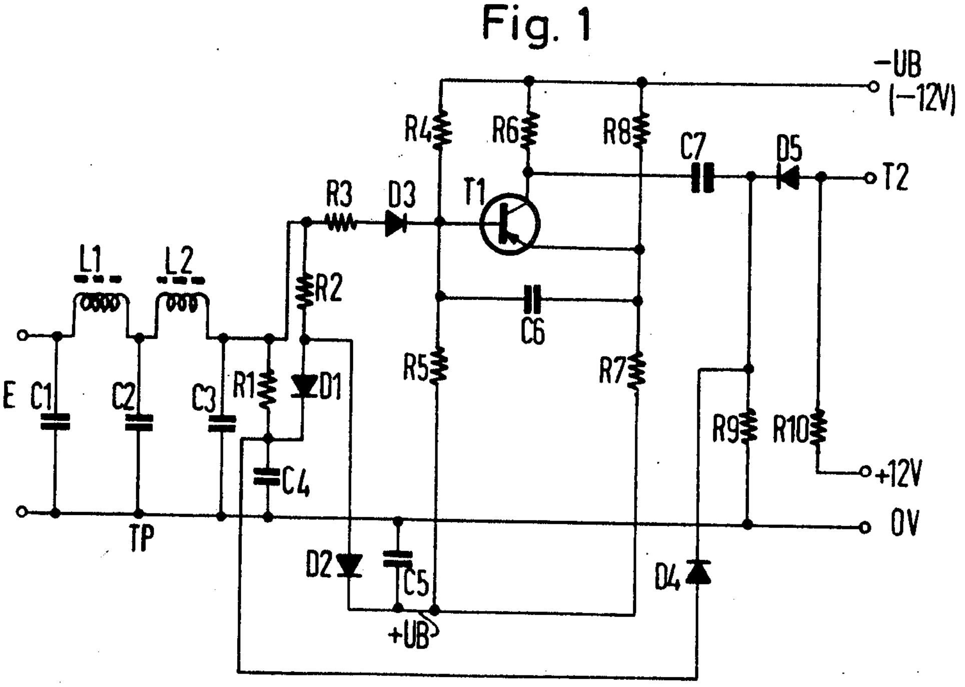
FIG. 1 is a schematic diagram of a receiving circuit according to the invention.
Figure 2A:
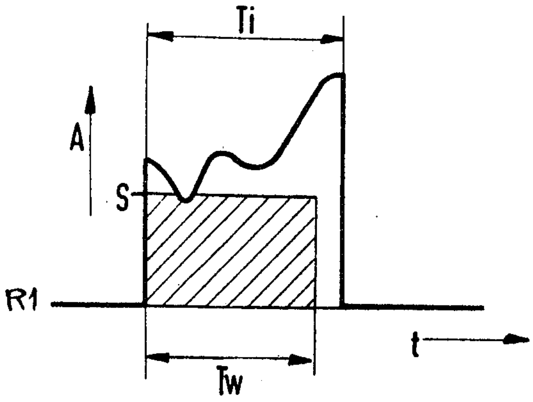
FIG. 2*a* is a graph showing a typical distorted synchronization pulse that may be applied to the circuit illustrated in FIG. 1.

FIG. 2*a* shows a typical waveform of an applied synchronization pulse that has been distorted by disturbance voltages, and which may be untilized in conjunction with the receiving circuit illustrated in FIG. 1. The edges (leading and trailing) of applied synchronization pulses must be sufficiently steep between the dynamic switching threshold value S of capacitor C6 and the lower reference value R1 of the synchronization pulses to ensure that a correct evaluation of synchronization pulse time duration is obtained. In the illustrative example it may be assumed that the time duration of the leading and trailing edges is approximately equal to 5% of the time duration T*i* of a synchronization pulse.

The amplitude level between the edges of applied synchronization pulses, A(*t*), may very randomly with respect to time, but for the most part, should be higher than the dynamic switching threshold value S. Further, the time duration, T*i*, of the synchronization pulses must be greater than the effective integration time T*w* associated with synchronization pulse time duration evaluation. However, to provide a good evaluation of synchronization pulse time duration, the difference between time intervals T*i* and T*w* should be minimized.

The polarities of the voltages present and utilized in selected portions of the receiving circuit, depends upon the type conductivity of the transistor switch (PNP or NPN) employed. Futrher, since the transistor switch should be blocked when a hold potential is applied to the receiving circuit between successive synchronization pulses, the emitter of the transistor is biased to approximately the average value of the hold potential and the first operational voltage (—UB). The synchronization pulse should have a steep trailing edge in order to control the pulse generating device connected to the output of the receiving circuit which, for example, may comprise monostable flip-flop means.

FIG. 1 illustrates a receiving circuit according to the invention, that may be utilized for detection of synchronization pulses in telegraphy exchange installations. The rectangular synchronization pulses may be produced by a monostable flip-flop device located at the transmitter station associated with the telegraphy exchange installation, and transmitted to the receiving circuit over a transmission line. The transmitter output circuit may comprise a low resistance output stage, as for example, a telegraph key switch. If the synchronization pulses are transmitted by a conductor associated with a cable, the other conductors associated with the cable may also transmit synchronization pulses are other pulse type signals having high peak amplitude values, that may distort the synchronization pulses transmitted by the transmitter.

The receiving circuit shown in FIG. 1 comprises a low pass filter TP, having two pi sections, the first section comprising capacitors C1 and C2, and inductor L1, and the second section comprising capacitors C2 and C3 and inductor L2, which function to reduce ripples present in applied synchronization pulses. The limiting frequency associated with the low pass filter is approximately 170 kHz., according to the illustrative example. An essential part of the receiving circuit is the integrating circuit that evaluates the time duration of the applied pulses, and comprises integrating capacitor C6. Additionally, two other integrating circuits are utilized, one of which produces the positive operational voltage, +UB, and the other of which scans the output of the receiving circuit through diode D5. Received distorted synchronization pulses are applied to low pass filter TP, which also substantially attenuates applied harmonic distortions of the synchronization pulses while maintaining the steepness of the leading and trailing edges of the synchronization pulses to ensure an accurate evaluation of synchronization pulse time duration.

For illustrative purposes, it may be assumed that synchronization pulses, each having a time duration equal to 100 microseconds, are applied to the input of the receiving circuit. Further, the shortest time interval between successive synchronization pulses may be assumed to be 20 microseconds. As discussed above, and in accordance with the illustrative example, the limiting frequency of low pass filter TP may be assumed to be approximately 170 kHz.

The integrating circuit to evaluate the time duration of applied synchronization pulses may be explained with reference to FIG. 2*b*. Synchronization pulse TJ is applied to connection point 1 of the receiving circuit, which may be connected to the output of a low pass filter such as the filter TP of FIG. 1. Further, a negative sychronization pulse TJ is shown which has a maximum amplitude of +12 volts and a minimum amplitude of —12 volts. During the time intervals between successive synchronization pulses a hold potential equal to +12 volts is therefore applied to the receiving circuit at connection point 1. During the time duration of a synchronization pulse, a voltage equal to —12 volts is applied to connection point 1. PNP transistor T1 is connected in common emitter configuration.

The first operational voltage, —UB, is applied to the collector of transistor T1 through resistor R6, to the emitter through resistor R8, and to the base through resistor R4. It provides a constant source of operational voltage. The second operational voltage is derived in response to the applied synchronization signals by an integrating circuit, as will be explained hereinafter, and produces the second operational voltage, +UB, that is applied to the base of transistor T1 through resistor R5, and the emitter of transistor T1 through resistor R7. Therefore it follows or tracks variations in the applied signals. The illustrative example assumes that the first operational voltage —UB is equal to approximately —12 volts, and the second operational voltage +UB is equal to approximately +11 volts.

The series connection of resistor R3 and diode D3 is connected between connection point 1 and the base of PNP transistor T1. Diode D3 is poled to be conductive in response to the +12 volts hold potential, and to thus provide a complete electrical connection between connection point 1 and —UB, through the series connection of resistor R3, diode D3, and resistor R4. Therefore, a positive voltage is produced at the base of transistor T1 (point 2), the amplitude of which depends upon the relative resistance values of resistors R3 and R4, when the hold potential (+12 volts) is applied to the receiving circuit. In this regard, the resistance of resistor R3 is relatively low.

Resistors R7 and R8 are connected in series between +UB and —UB and their respective resistances are equal. Therefore, the series connection between resistors R7 and R8 (point 3) will be at a potential that is slightly less than zero (0) volt, and it is seen that the emitter of transistor T1 is connected to said series connection (point 3). Thus, under the described conditions when the hold potential is applied to the receiving circuit, the base of transistor T1 is more positive than its emitter. Since transistor T1 comprises a PNP transistor, it will be blocked from conducting, and it functions as a transistor switch.

Figure 2B:
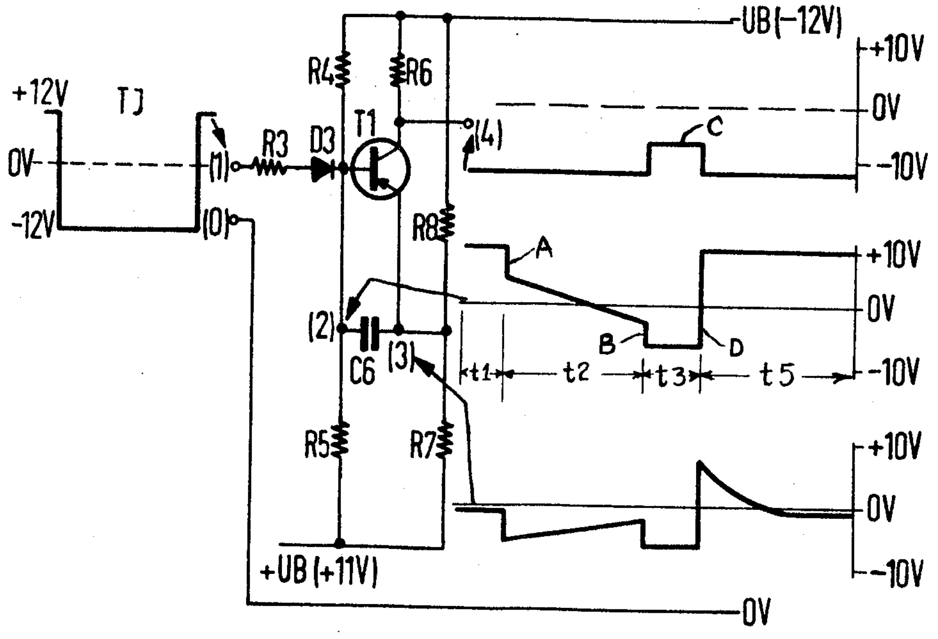
FIG. 2*b* is a schematic diagram of the integration circuit to evaluate the time duration of applied synchronization pulses, with corresponding graphs of the waveforms existing at certain points of the circuit.

Thus, with reference to the graphs shown in FIG. 2*b*, during time *t*1, hold potential +12 volts (corresponding to the time interval between successive applied synchronization pulses) is applied to the receiving circuit. According to the illustrative example, the base of transistor switch T1 (point 2) assumes a potential of +10 volts, and the emitter of transistor switch T1 (point 3) assumes a potential slightly less than zero (0) volt. Thus, the base of transistor switch T1 is more positive than its emitter and it is therefore blocked from conduction.

The integrating network comprising capacitor C6 and resistors R5 and R7 is connected between connection point 1 and +UB, and functions to evaluate the time duration of applied synchronization pulses. Further, capacitor C6 is connected between the base (point 2) and emitter (point 3) of transistor switch T1. Therefore, when transistor switch T1 is blocked from conduction in response to the hold potential +12 volts being applied to the receiving circuit, capacitor C6 is charged to the corresponding potential existing between the base and emitter of transistor switch T1, according to the time constant $tc1$, wherein $tc1=(R3||R4||R5+R7||R8)\cdot C6$. The symbolic designation || refers to the parallel combination of the associated resistors with respect to their common connection to capacitor C6. In the present example, it may be assumed that time constant $tc1$ is equal to approximately 24 microseconds.

The explanation of the operation of the receiving circuit, especially with reference to integrating capacitor C6, is then simplified if it is assumed that the positive operating potential +UB obtained by integration of the input signals applied to the receiving circuit is constant. Since the time interval between successive synchronization pulses has been assumed to be 20 microseconds, a synchronization pulse TJ is applied to the input of the receiving circuit before capacitor C6 can be charged to a substantial degree, in view of the fact that charge time constant $t1$ is equal to 24 microseconds. This provides for the integrating circuit comprising capacitor C6 to evaluate the time duration of the synchronization pulses, because it follows or tracks the leading edge of applied synchronization pulses to produce corresponding voltage leaps in the negative direction at the base (point 2) and emitter (point 3) of transistor T1. This is the reason that the leading and trailing edges of the synchronization pulses must meet the steepness criteria set forth above.

With reference to FIG. 2*b*, it is seen that there is a voltage leap at time A in the negative direction at connections points 2 and 3, in response to the leading edges of applied synchronization pulses. Thus, during the transition between the hold potential and the leading edge of the synchronization pulse, there is a period of time during which diode D3 continues to conduct, and it is during this period of time that the described voltage leap occurs. Immediately when diode D3 is blocked, the potential at the base (point 2) of transistor switch T1 goes more negative according to the time constant $tc2$, wherein $tc2=(R4||R5)\cdot C6$, because the +12 volts hold potential is no longer applied thereto.

Simultaneously, the voltage at the emitter of transistor switch T1 (point 3) goes more positive and increases towards zero (0) volt, according to the time constant $tc3$ wherein $tc3=(R7||R8)\cdot C6$. Therefore, the charges of the plates of the capacitor corresponding to connection points 2 and 3 are changed towards the described values, according to the time constant $tc_T$, wherein $tc_T=tc2+tc3$. In the described illustrative example, time constants $tc2$ and $tc3$ are respectively equal to 68 and 20 microseconds, and therefore $tc_T$ equals 88 microseconds.

Diode D3 is blocked during the time interval that synchronization pulses TJ are applied to the receiving circuit. The described change in the charge of capacitor C6 according to time constants $tc2$ and $tc3$ continues until the base of transistor switch T1 becomes more negative than its emitter, and thereby drives transistor switch T1 to the conducting state. The time associated with driving transistor switch T1 to the conducting state is very slight, because the negative potential to which the plate of capacitor C6 corresponding to connection point 2 is discharging, is relatively high, compared to the base-emitter voltage that is necessary to initiate transistor switch T1 conduction. When transistor switch T1 is switched to the conducting state, the voltage across capacitor C6 is limited to the base-emitter voltage of approximately 0.2 volt, and a voltage leap in the negative direction occurs at the base (point 2) and the emitter (point 3) as shown by time B.

When transistor switch T1 is controlled to conduction the potential at its emitter (point 3) and collector (point 4) are determined by the voltage divider comprising the series connection of resistor R7 and the parallel connection of resistors R6 and R8 between +UB and −UB. In this regard the resistance of transistor T1 can be disregarded because it is relatively low in the conducting state thereof.

During the remaining time duration $t3$ of the synchronization pulse TJ, transistor switch T1 is controlled to conduction in the saturated state, and a corresponding pulse C is produced at its collector output (point 4) when the trailing edge of the synchronization pulse is applied to the receiving circuit. Thus, the trailing edge of the synchronization pulse causes diode D3 to be controlled to conduction in response to the positive hold potential +12 volts applied to the receiving circuit. Since resistor R3 is of relatively low resistance the charge of capacitor C6 is then rapidly changed according to time constant $tc4$, wherein $tc4=(R3||R4||R5+R6||R7)\cdot C6$, at time D. According to the illustrative example, time constant $tc4$ is equal to approximately 12 microseconds. Since capacitor C6 is charged to approximately 0.2 volt (when the trailing edge of the synchronization pulse is applied to the receiving circuit) the base (point 2) of transistor switch T1 is rapidly driven more positive than its emitter in response to the positive hold potential (+12 volts) applied to the receiving circuit and transistor switch T1 is blocked. This occurs at time D with reference to FIG. 2*b* which also shows that the trailing edge of the synchronization pulse drives the emitter of transistor switch T1 more positive. That is, the trailing edge of the synchronization pulse is followed or tracked by both the base and emitter of transistor switch T1, and therefore the corresponding voltage leaps in the positive direction are indicated at time D.

When transistor switch T1 is thus blocked, a suddent voltage drop occurs across the collector load resistor R6 (point 4) to form pulse C. The trailing edge of pulse C controls the pulse generating device that may comprise, for example, a monostable flip-flop stage. Therefore, the integrating circuit comprising capacitor C6 accurately evaluates the time duration of successive pulses, and controls an associated pulsed generating device connected to the output of the circuit shown in FIG. 1 in response to the trailing edges of the applied synchronization pulses.

During time interval $t5$ the hold potential (+12 volts) is again applied to the receiving circuit. Thus the base of transistor switch T1 is maintained at a positive potential (+10 volts) as explained above, with respect to its emitter, and transistor switch T1 is blocked. Further, the applied hold potential causes the plate of capacitor C6 that is associated with connection point 3 to go more negative and to approach the potential value of slightly less than zero (0) volt, which existed during the described time interval $t1$. The cycle is thus completed, and the receiving circuit is ready to receive the succeeding synchronization pulse TJ.

The voltages present at selected parts of the receiving circuit are of such values as to enable the receiving circuit to function as described.

Thus, for example, during the time duration *Ti* of applied synchronization pulses, diode D3 must be blocked with certainty. In order to achieve this, the relative resistances of resistors R4 and R5 must be selected in such a way that, when transistor T1 is blocked, the instantaneous voltage of applied synchronization pulses does not exceed the voltage at point 2. Otherwise, diode D3 would be polarized to conduction. Further, when transistor switch T1 is conducting, the input voltage must be more negative than the voltage at point 3 resulting from the voltage division produced by the voltage divider comprising the series connection of resistor R7 and the parallel connection of resistors R6 and R8. Thus, by appropriately selecting the values of the resistors, transistor switch T1 can be controlled into its saturated conducting state with resistor R4 chiefly determining the time associated with evaluation of synchronization pulse time duration.

A further voltage threshold is provided by the voltage divider comprising resistors R6, R7, and R8, which determines the amplitude of the output pulse C produced when transistor switch T1 is first controlled to conduction and then to nonconduction. Yet another voltage threshold determines the potential at the emitter of transistor switch T1 (point 3) when transistor switch T1 is blocked. The potential at the emitter (point 3) is set to slightly less than zero (0) volt by the voltage divider comprising resistors R7 and R8. Further, resistors R7 and R8 determine time constants $tc2$ and $tc3$, and thus the dynamic threshold switching value at which conduction of transistor switch T1 is initiated, which is especially significant with respect to short time duration, high amplitude hold potentials.

The receiving circuit also comprises another integrating circuit comprising the series connection of resistor R2, diode D2, and capacitor C5 that determine the time constant associated with generation of the positive operational voltage +UB; see FIG. 1. The charging circuit of capacitor C5 must have a time constant that is relatively small, in order that any positive distortion peaks applied to the receiving circuit are integrated in a short period of time. As an illustrative example the time constant of the described integrating circuit comprising resistor R2, diode D2, and capacitor C5 is approximately 50 microseconds. It is seen that the positive operational voltage +UB is developed across capacitor C5.

Another integrating circuit comprises resistors R1, R2, and R9, diodes D1 and D4, and capacitors C4 and C7, that controls diode D5 connected in the output circuit of the receiving circuit illustrated in FIG. 1. Thus the positive hold potential applied between successive synchronization pulses is applied to diode D5 through the series connection of resistor R2, diode D1, and diode D4, which thereby applies a positive blocking potential to the cathode of diode D5. The time constant associated with application of the blocking potential to the cathode of diode D5 is $tc5$ wherein $tc5$ is equal to $(R1+R2)\cdot C4$, and in the illustrative example is approximately equal to 7 microseconds. Further, in order that an output signal is produced by the receiving circuit only after the trailing edges of the synchronization pulses are applied thereto, capacitor C7 is provided to maintain diode D5 in blocked condition after transistor switch T1 is controlled to the conducting state, the predetermined time period after the leading edges of the synchronization pulses are applied to the receiving circuit. Since diodes D4 and D5 are blocked, the time constant associated with charging capacitor C7 to function as described is equal to time constant $tc6$ wherein $tc6$ is equal to $(R6+R9)\cdot C7$, and in the illustrative example is equal to approximately 18 microseconds. Then, in response to the trailing edges of the synchronization pulses, the collector of transistor switch T1 is driven sufficiently negative to unblock diode D5 and apply a corresponding output signal to the pulse generating device. Therefore the output pulse C produced by conduction of transistor switch T1, is not applied to the pulse generating device until it is effectively released thereto by the trailing edges of the synchronization pulses. Thus, the receiving circuit output pulse applied to the pulse generating device commences with the trailing edge of the synchronization pulse and it time duration depends upon the relative values of capacitor C7 and resistors R6.

Figure 3:
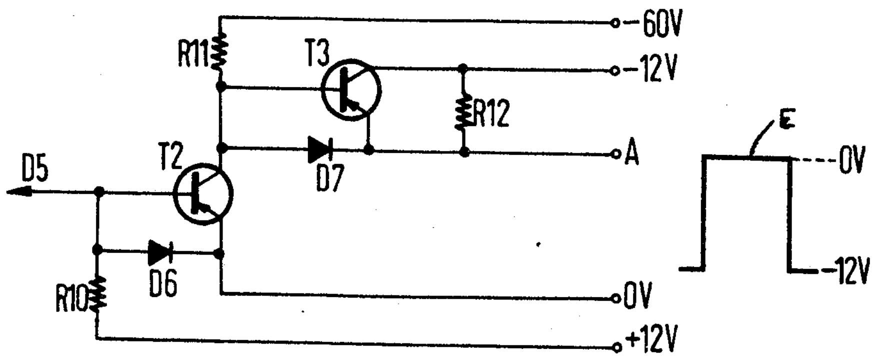
FIG. 3 illustrates a pulse generating device that may be connected to the output of the receiver circuit illustrated in FIG. 1.

FIG. 3 shows a transistor switch circuit comprising a flip-flop circuit that may be used as the pulse generating means connected to the output of the receiving circuit shown in FIG. 1. Thus, the output signals produced by the receiving circuit are applied through diode D5 to the input of the pulse generating device. The trailing edge of output pulse C which is prdouced in response to the trailing edge of the synchronization pulse, switches the pulse generating means by applying a negative signal to transistor T2, thereby controlling PNP transistor T2 to the conducting state. The positive output signal produced in response to conduction of transistor T2 is applied through diode D7 to the base and emitter of PNP transistors T3 and causes said transistor to be blocked. Therefore, transistor T3 does not produce an output signal between its collector and emitter, and terminal A is clamped to zero (0) volt through conduction of transistor T2.

If transistor T2 is blocked by the positive voltage applied to its base and consequently to its emitter through diode D6, in the absence of an applied negative voltage, transistor T3 is controlled to conduction because its base is connected to the −60 volt potential source through resistor R11, and therefore, output terminal A is clamped to the −12 volt potential through conducting transistor T3. Therefore the time period during which transistor T2 conducts determines the time duration of the rectangular pulses produced at the output of the described flip-flop circuit.

Thus, depending upon the input signals to the pulse generating device shown in FIG. 3, rectangular pulses as shown in FIG. 3 may be produced. Of course, generating devices other than the monostable flip-flop circuit shown in FIG. 3 may be employed, in conjunction with the receiving circuit shown in FIGS. 1 and 2, to provide accurate control signals that are derived from possibly distorted synchronization pulses applied to the receiving circuit.

It will also be evident that a number of minor modifications could be made in the system described herein, without departure from the scope of the invention. Accordingly, the invention is not to be considered limited to the system specifically described in this application, but rather only by the scope of the appended claims.

I claim:

1. A detection circuit to detect received time-spaced pulses that are subject to distortion during transmission comprising:
   - input means to receive the time-spaced pulses,
   - a transistor switch (T1) having a base, an emitter, and a collector, the input means being connected between the base and emitter of the transistor (T1).
   - first integrating means (R5, R7, C6) having a first capacitor (C6) connected between the base and emitter of the transistor switch (T1),
   - biasing means (D3, R4, R5) connected between the input means and the base of the transistor switch (T1) to bias the transistor switch (T1) to conduction in response to the leading edges of applied pulses, and to block the transistor switch (T1) from conduction in response to the trailing edges of applied pulses,
   - pulse generating means connected between the emitter and collector of the transistor switch (T1), and
   - control means (D1, D4, D5, C4, C7, R1, R6, R9) interposed between the input means and the pulse generating means (T2, T3) to cause the trailing edges of output signals produced by the transistor switch (T1) when it is biased to conduction to be applied to the pulse generating means (T2, T3) in response to the trailing edges of applied pulses.

2. The detection circuit recited in claim 1 wherein the biasing means bias the transistor switch (T1) to conduction a predetermined time period after the leading edges of the applied pulses are received.

3. The detection circuit recited in claim 2 wherein the input means comprise low pass filter means (TP).

4. The detection circuit recited in claim 3 wherein the time-spaced pulses comprise successive pulses separated by a hold potential of predetermined time duration, and wherein the input means further comprises first rectifier means (D3) interposed between the low pass filter means (TP) and the base of the transistor switch (T1) to initially block the transistor switch (T1) from conduction in response to received pulses.

5. The detection circuit recited in claim 1 further comprising second integrating means (R2, D2, C5) connected between the low pass filter means (TP) and the base and emitter of the transistor switch (T1) responsive to the applied time-spaced pulses to produce an operational voltage that is applied to the base and emitter of the transistor switch (T1).

6. The detection circuit recited in claim 5 wherein the control means (D1, D4, D5, C4, R1, R9) are interposed between the low pass filter means (TP) and the pulse generating means.

7. The detection circuit recited in claim 6 wherein the control means further compriseses third integrating means (C7, R6) having a second capacitor (C7) connected between the collector of the transistor and the pulse generating means.

8. The detection circuit recited in claim 7 wherein the control means further comprises second rectifier means (D5) interposed between the second capacitor (C7) and the pulse generating means (T2, T3) polarized to apply an output signal when it is biased to conduction in response to the trailing edges of the received time-spaced pulses.

9. The detection circuit recited in claim 8 further comprising a constant source of operational voltage (—UB), first (R4), second (R8), and third (R6) resistors connecting the constant source of operational voltage (—UB) to the base, emiter, and collector, respectively, of the transistor switch (T1).

10. The detection circuit recited in claim 9 wherein the pulse generating means (T2, T3) comprises a monostable flip-flop device.

11. The detection circuit recited in claim 10 wherein the monostable flip-flop device is responsive to the trailing edges of received time-spaced pulses to produce a corresponding control signal.

12. The detection circuit recited in claim 1 wherein the pulse generating means comprises first (T2) and second (T3) transistors connected thereto, each having a base, an emitter, and a collector, the first transistor (T2) responsive to output signals produced by the transistor switch (T1) to produce a first output signal (0 volt), the second transistor (T3) responsive to the absence of output signals produced by the transistor switch (T1) to produce a second output signal (—12 volts).

13. The detection circuit recited in claim 12 wherein the pulse generating means further comprises biasing means (+12 v., R10, D6, —60 v., R11, D7) to block conduction of the first transistor (T2) in the absence of applied output signals produced by the transistor switch (T1) and to block conduction of the second transistor (T3) when output signals are produced by the transistor switch (T1).

14. The detection circuit recited in claim 13 wherein the biasing means comprise third (D6) and fourth (D7) rectifier means connected between the bases and emitter of the first (T2) and second (T3) transistors, respectively, and wherein the pulse generating means is connected to the base of the first transistor (T2), and the collector of the first transistor (T2) is connected to the base of the second transistor (T3).

References Cited

UNITED STATES PATENTS

| | | | |
|---|---|---|---|
| 2,943,264 | 6/1960 | Anderson | 328—164 |
| 3,277,311 | 10/1966 | Merlen et al | 307—234 |
| 3,346,743 | 10/1967 | Strenglein | 307—234 |
| 3,349,251 | 10/1967 | Wilder | 307—234 |

JOHN S. HEYMAN, Primary Examiner

J. D. Frew, Assistant Examiner

U.S. Cl. X.R.

307—234, 237, 263; 328—128